(12) United States Patent
Yu

(10) Patent No.: US 8,161,725 B2
(45) Date of Patent: Apr. 24, 2012

(54) COMPACT CYCLONE COMBUSTION TORCH IGNITER

(75) Inventor: Tai Yu, Canoga Park, CA (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 842 days.

(21) Appl. No.: 12/235,492

(22) Filed: Sep. 22, 2008

(65) Prior Publication Data

US 2010/0071343 A1    Mar. 25, 2010

(51) Int. Cl.
  *F02C 7/264* (2006.01)
  *F02G 1/055* (2006.01)
(52) U.S. Cl. ............ 60/39.821; 60/39.826; 60/200.1; 60/204; 102/374; 239/132.3; 431/158
(58) Field of Classification Search .......... 431/158, 431/159, 160, 8, 9, 10, 115, 116, 173; 102/374, 102/380; 239/132.3, 132.5, 127.3; 60/200.1, 60/204, 39.821, 39.826, 39.827, 39.828
See application file for complete search history.

(56) References Cited

U.S. PATENT DOCUMENTS

| | | | |
|---|---|---|---|
| 3,463,601 A * | 8/1969 | Childree | 431/158 |
| 3,630,150 A | 12/1971 | Rakowsky | |
| 3,811,359 A | 5/1974 | Marchese et al. | |
| 3,854,401 A | 12/1974 | Fisher | |
| 3,927,958 A * | 12/1975 | Quinn | 431/116 |
| 3,948,175 A | 4/1976 | Bucklisch | |
| 3,948,697 A | 4/1976 | Flanagan et al. | |
| 3,954,526 A | 5/1976 | Mangum et al. | |
| 3,982,392 A * | 9/1976 | Crow | 60/39.23 |
| 3,982,488 A | 9/1976 | Rakowsky et al. | |
| 3,994,226 A | 11/1976 | Rakowsky et al. | |
| 3,994,232 A | 11/1976 | Rakowsky et al. | |
| 4,033,115 A | 7/1977 | Baits | |
| 4,036,581 A | 7/1977 | Keyser et al. | |
| 4,082,497 A * | 4/1978 | Crawford et al. | 431/158 |
| 4,151,711 A * | 5/1979 | Fromm et al. | 60/39.23 |
| 4,342,551 A * | 8/1982 | Browning | 431/10 |
| 4,366,860 A * | 1/1983 | Donaldson et al. | 166/59 |
| 4,385,661 A * | 5/1983 | Fox | 166/59 |
| 4,429,534 A | 2/1984 | Joy | |
| 4,441,156 A | 4/1984 | Barbeau | |
| 4,442,898 A * | 4/1984 | Wyatt | 166/303 |
| 4,488,856 A | 12/1984 | Preble et al. | |
| 4,498,287 A * | 2/1985 | Schirmer et al. | 60/772 |
| 4,507,075 A * | 3/1985 | Buss et al. | 431/115 |
| 4,518,348 A * | 5/1985 | Wedge et al. | 431/265 |
| 4,638,173 A | 1/1987 | Milton | |
| 4,648,835 A * | 3/1987 | Eisenhawer et al. | 431/4 |
| 4,664,134 A | 5/1987 | Pera | |
| 4,697,238 A | 9/1987 | Barbeau | |
| 4,697,524 A | 10/1987 | Penner et al. | |
| H0372 H | 11/1987 | Campbell | |
| 4,704,865 A | 11/1987 | Archung | |
| 4,711,089 A | 12/1987 | Archung | |
| 4,777,793 A | 10/1988 | Weigand et al. | |
| 4,800,716 A | 1/1989 | Smith et al. | |
| 4,892,037 A | 1/1990 | Betts | |
| 4,893,815 A | 1/1990 | Rowan | |

(Continued)

*Primary Examiner* — William H Rodriguez
(74) *Attorney, Agent, or Firm* — Carlson Gaskey & Olds P.C.

(57) ABSTRACT

A torch igniter and method of cooling the torch igniter includes axially flowing a first stream of gaseous oxidizer through a torch throat and vortically flowing a second stream of the gaseous oxidizer within a combustion chamber.

24 Claims, 5 Drawing Sheets

U.S. PATENT DOCUMENTS

| | | | |
|---|---|---|---|
| 4,899,956 A | 2/1990 | King et al. | |
| 4,912,921 A | 4/1990 | Rice et al. | |
| 4,916,904 A | 4/1990 | Ramsaier et al. | |
| 4,928,605 A * | 5/1990 | Suwa et al. | 110/261 |
| 4,938,139 A | 7/1990 | Brede et al. | |
| 4,953,440 A | 9/1990 | Moscrip | |
| 5,022,324 A | 6/1991 | Rice, Jr. | |
| 5,052,817 A | 10/1991 | Bement et al. | |
| 5,055,030 A * | 10/1991 | Schirmer | 431/10 |
| 5,080,305 A | 1/1992 | Stencel | |
| 5,115,638 A | 5/1992 | Reed et al. | |
| 5,149,261 A * | 9/1992 | Suwa et al. | 431/207 |
| 5,208,575 A | 5/1993 | Temple | |
| 5,214,911 A | 6/1993 | Shekleton | |
| 5,220,783 A | 6/1993 | Cherry et al. | |
| 5,249,952 A * | 10/1993 | West et al. | 431/5 |
| 5,271,226 A | 12/1993 | Stone | |
| 5,321,327 A | 6/1994 | Jensen | |
| 5,431,010 A | 7/1995 | Stone | |
| 5,485,788 A | 1/1996 | Corney | |
| 5,490,776 A * | 2/1996 | Miyama et al. | 431/215 |
| 5,536,990 A | 7/1996 | Nelson | |
| 5,636,511 A * | 6/1997 | Pfefferle et al. | 60/39.822 |
| 5,685,504 A | 11/1997 | Schneider et al. | |
| 5,694,764 A | 12/1997 | Blain et al. | |
| 5,765,251 A | 6/1998 | Jones et al. | |
| 5,787,685 A | 8/1998 | Miller, II et al. | |
| 6,050,085 A | 4/2000 | Mayer | |
| 6,066,898 A | 5/2000 | Jensen | |
| 6,082,098 A | 7/2000 | Park et al. | |
| 6,182,436 B1 * | 2/2001 | Prociw et al. | 60/776 |
| 6,199,365 B1 | 3/2001 | Pretorius et al. | |
| 6,226,980 B1 | 5/2001 | Katorgin et al. | |
| 6,244,040 B1 | 6/2001 | Adzhian et al. | |
| 6,244,041 B1 | 6/2001 | Vasin et al. | |
| 6,253,539 B1 | 7/2001 | Farhangi et al. | |
| 6,255,009 B1 | 7/2001 | Rusek et al. | |
| 6,269,630 B1 | 8/2001 | Kreiner et al. | |
| 6,272,845 B2 | 8/2001 | Kessaev et al. | |
| 6,272,847 B1 | 8/2001 | Dietrich | |
| 6,274,945 B1 | 8/2001 | Gilbreth et al. | |
| 6,381,949 B1 | 5/2002 | Kreiner et al. | |
| 6,446,909 B1 | 9/2002 | Michelson | |
| 6,453,937 B1 | 9/2002 | Tobias | |
| 6,469,424 B1 | 10/2002 | Marable | |
| 6,470,670 B2 | 10/2002 | Maeding | |
| 6,505,463 B2 | 1/2003 | Kruse et al. | |
| 6,536,208 B1 | 3/2003 | Kretschmer | |
| 6,568,171 B2 | 5/2003 | Bulman | |
| 6,655,127 B2 | 12/2003 | Kruse et al. | |
| 6,664,653 B1 | 12/2003 | Edelman | |
| 6,679,155 B1 | 1/2004 | Yaschur et al. | |
| 6,758,199 B2 | 7/2004 | Masters et al. | |
| 6,769,242 B1 | 8/2004 | Balepin | |
| 6,829,899 B2 | 12/2004 | Benham, Jr. et al. | |
| 6,880,491 B2 | 4/2005 | Reiner et al. | |
| 6,887,821 B2 | 5/2005 | Mays et al. | |
| 6,912,857 B2 * | 7/2005 | Schmotolocha et al. | 60/776 |
| 6,918,243 B2 | 7/2005 | Fisher | |
| 6,935,241 B2 | 8/2005 | Hudelmaier et al. | |
| 6,959,893 B1 | 11/2005 | Sadowski et al. | |
| 6,966,769 B2 | 11/2005 | Elvander et al. | |
| 7,914,280 B2 * | 3/2011 | Schlote et al. | 431/9 |
| 2001/0015063 A1 | 8/2001 | Maeding | |
| 2003/0046923 A1 | 3/2003 | Dressler et al. | |
| 2004/0148923 A1 | 8/2004 | Hewitt | |
| 2004/0148925 A1 | 8/2004 | Knight | |
| 2004/0177603 A1 | 9/2004 | Hewitt | |

* cited by examiner

COMPACT CYCLONE COMBUSTION TORCH IGNITER

BACKGROUND

The present application relates to an igniter system for ignition of a rocket engine or other combustion device for propulsion, power, or industrial processing applications, and more particularly to a compact high combustion intensity combustor/torch igniter.

Various ignition systems utilized in bipropellant rocket engines include spark igniters, augmented spark igniters (ASI), pyrotechnique (flare rod), hypergol slug cartridge and combustion wave igniters (CWI). Spark igniters, though capable of delivering multiple sparks in rapid discharge rates, may be subject to spark-quenching at elevated operating pressures.

SUMMARY

A method of cooling a torch igniter which has a combustion chamber and a torch throat according to an exemplary aspect of the present disclosure includes axially flowing a first stream of gaseous oxidizer through the torch throat. Vortically flowing a second stream of the gaseous oxidizer within the combustion chamber. Communicating a fuel into the combustion chamber to yield a mixture with the second stream. Igniting the mixture to yield a combusting mixture and communicating the combusting mixture through the torch throat.

BRIEF DESCRIPTION OF THE DRAWINGS

The drawings that accompany the detailed description can be briefly described as follows.

DETAILED DESCRIPTION OF THE DISCLOSED EMBODIMENT

Figure 1A:
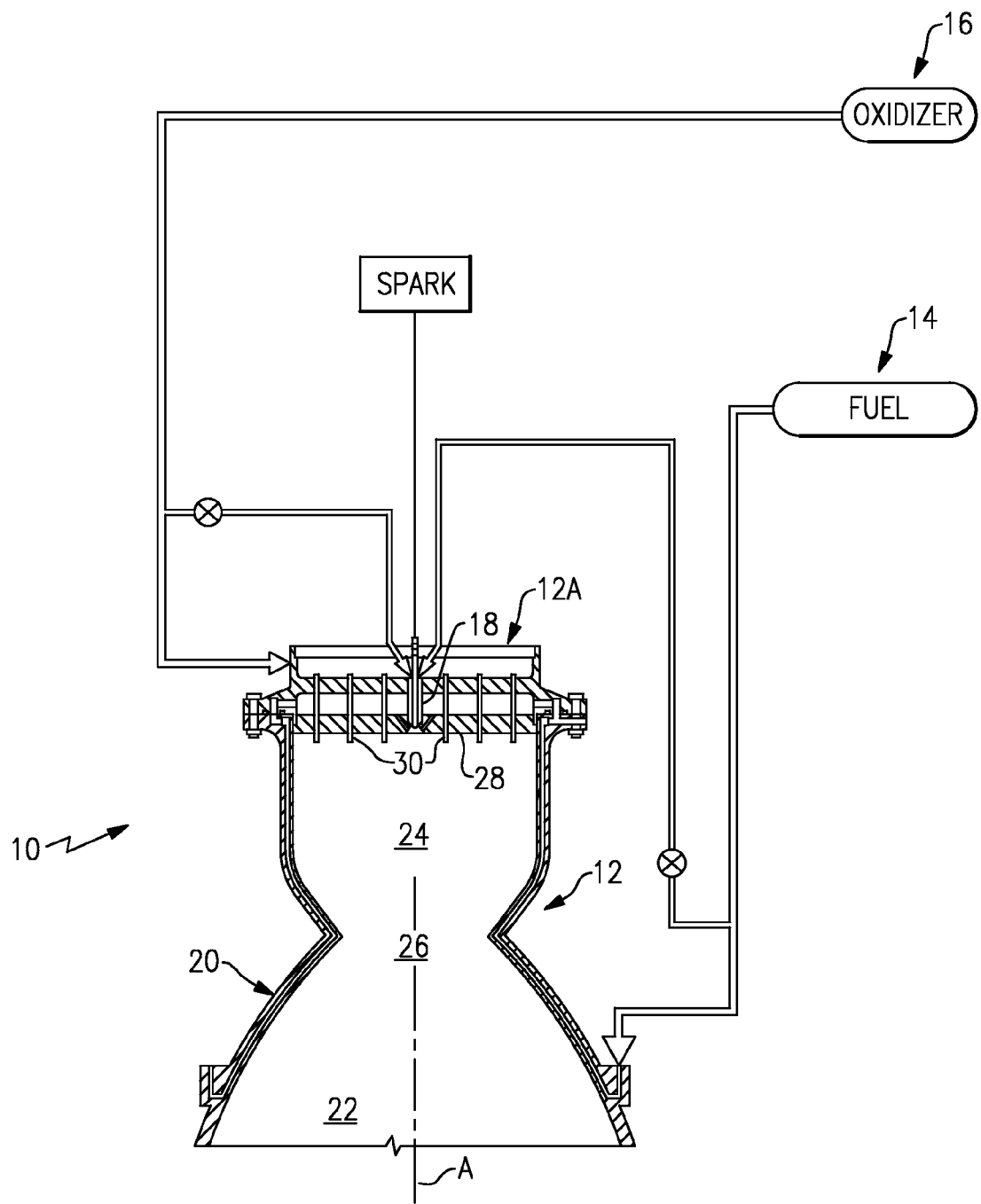
FIG. 1A is a general schematic view of an exemplary rocket engine embodiment for use with the present application.

FIG. 1A illustrates a general schematic view of a combustor system 10. The combustor system 10 generally includes a combustion chamber assembly 12, a fuel system 14, an oxidizer system 16 and an ignition system 18. The fuel system 14 and the oxidizer system 16 provide an ignitable propellant combination to the combustion chamber assembly 12. It should be understood that although a rocket engine combustor system is disclosed in the illustrated embodiment, air-breathing engines, power generators and other propulsion, power, or industrial processing applications where reliable ignition, stable combustion over wide operating mixture ratios, compact size and robust durability are required will also benefit herefrom.

The combustion chamber assembly 12 includes an injector system section 12A with an injector face 28 having a multitude of fuel/oxidizer injector elements 30 which receive a fuel and an oxidizer via separate paths from, for example, a dome and a manifold. The propellant combination is ignited by the ignition system 18.

Figure 1B:
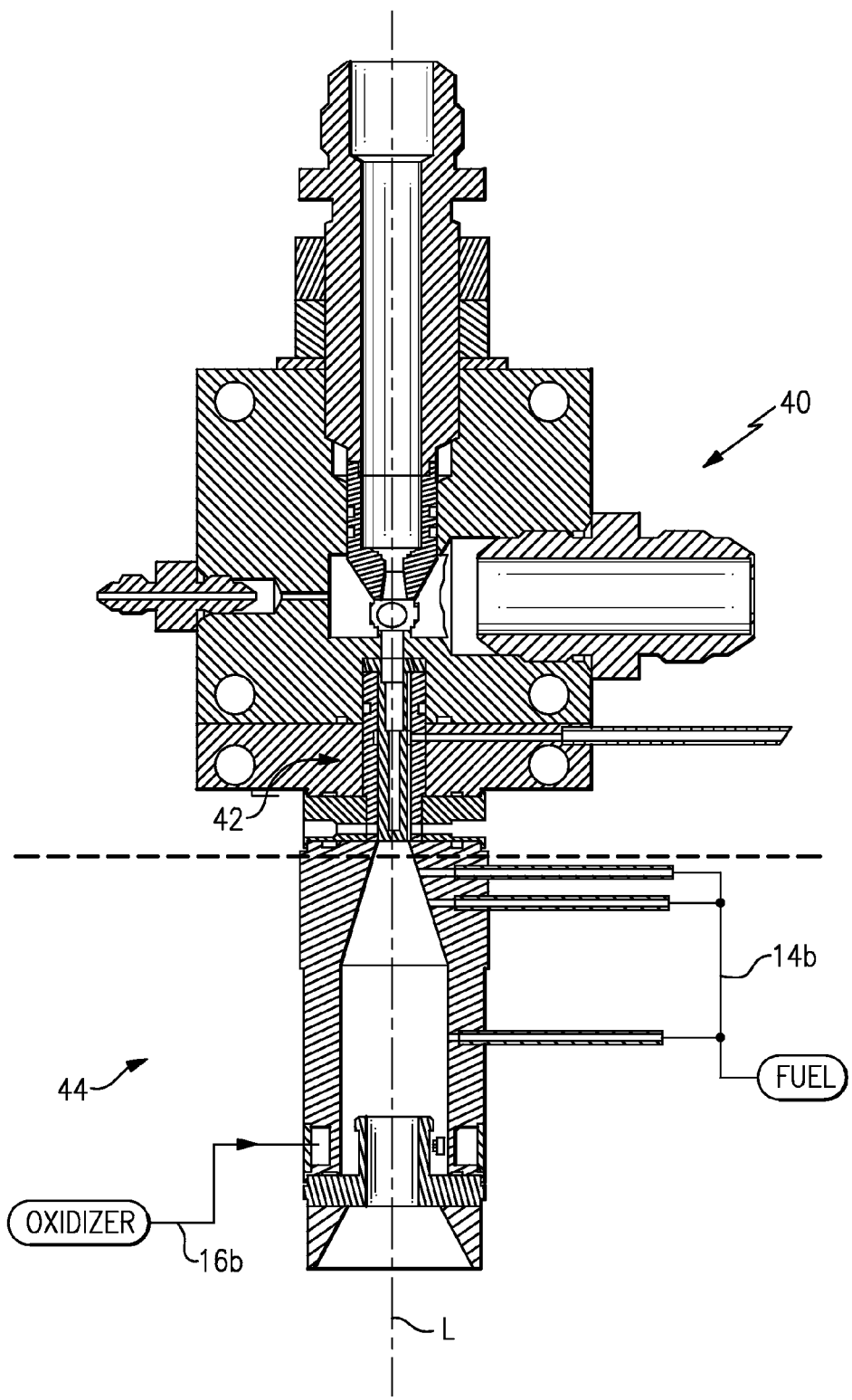
FIG. 1B is a longitudinal sectional view of a cyclone combustor torch igniter.

The ignition system 18 generally includes a cyclone combustor torch igniter 40 having an ignition source 42 and a cyclone combustor 44 defined along a longitudinal axis L (schematically illustrated; FIG. 1B). The ignition source 42 may include a resonance driven glow plug assembly, a spark igniter, a glow plug or other such thermal element. The torch igniter 40 may be mounted within the injector section 12A to ignite the fuel/oxidizer propellant mixture formed adjacent the fuel/oxidizer injector elements 30 within the chamber section 24.

Figure 2A:
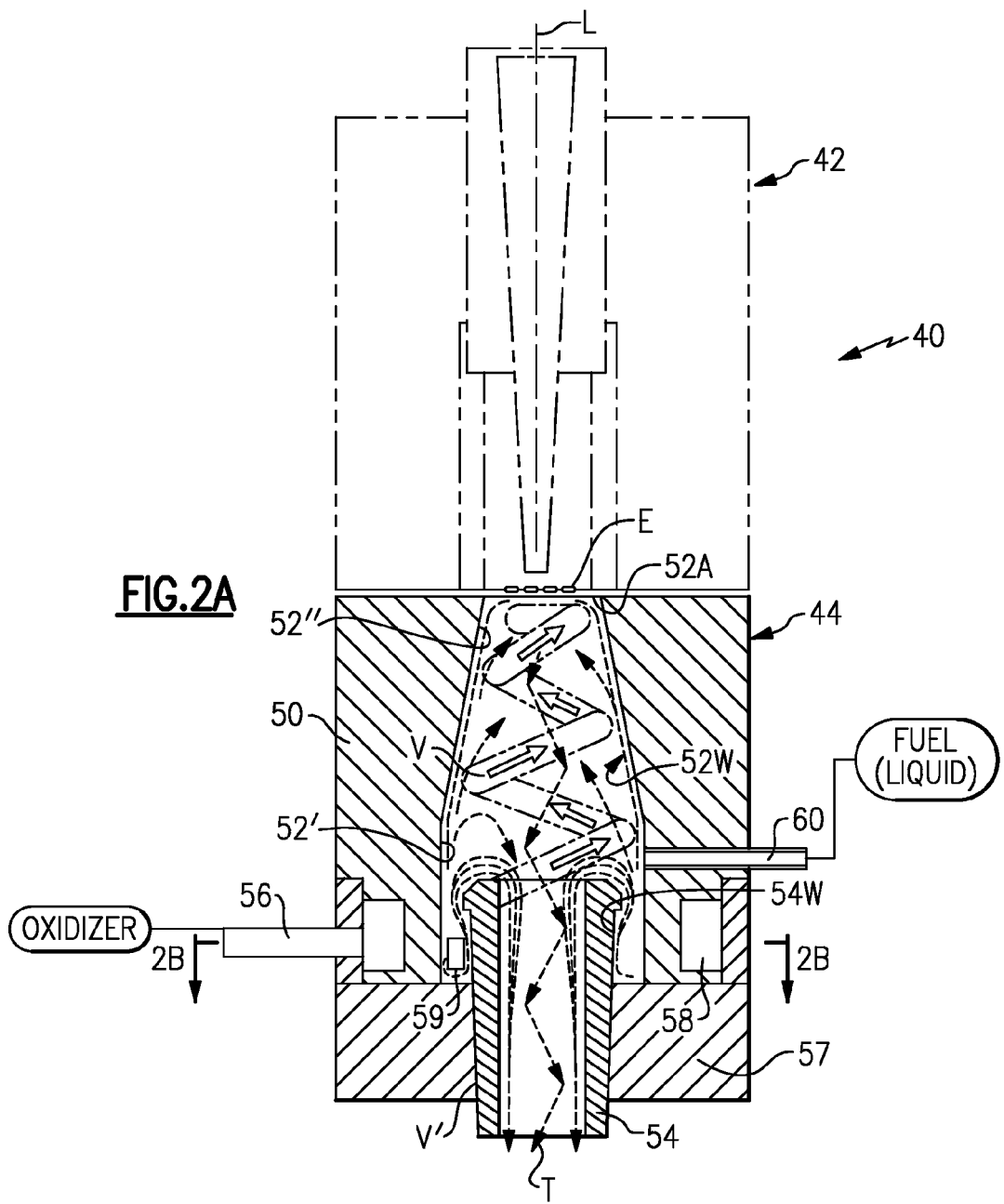
FIG. 2A is a schematic sectional view of a cyclone combustor torch igniter of FIG. 2A.
Figure 2B:
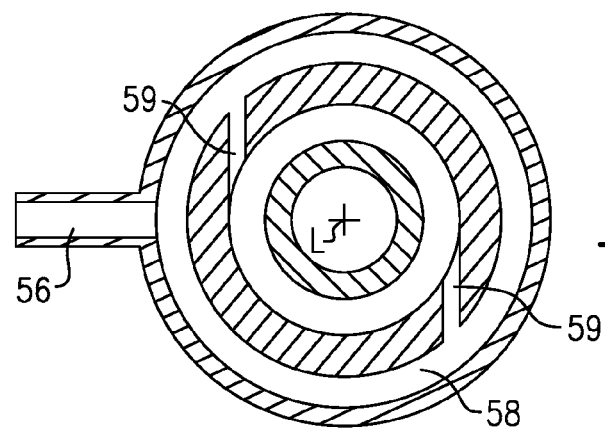
FIG. 2B is a schematic sectional view of the cyclone combustor torch igniter of FIG. 2A taken along line 2B-2B.

Referring to FIG. 2A, the cyclone combustor 44 generally includes a housing 50 which defines a combustion chamber 52, a torch throat 54, an oxidizer inlet 56, a ring manifold 58 (FIG. 2B) having at least one tangential inlet 59 and at least one radial fuel inlet 60. The combustion chamber 52 includes a generally cylindrical section 52' and a generally frustro-conical section 52". The generally frustro-conical section 52" forms a truncated apex 52A which includes a high temperature element E of the ignition source 42. The truncated apex 52A may be closed and receive thermal energy in a glow plug arrangement or may include a port to receive a spark or the like from the high temperature element E to thereby ignite the ignitable propellant combination within the cyclone combustor 44. The length to diameter ratio of the combustion chamber 52, in one non limiting embodiment, is approximately 3 overall and about 2 for the generally frustro-conical section 52" with included angles under approximately 30 degrees.

The torch throat 54 may extend at least partially into the cylindrical section 52 opposite the ignition source 42. In one non-limiting embodiment, the torch throat 54 is a generally cylindrical member. The at least one tangential inlet 59 is located at the generally cylindrical section 52' displaced from the entrance of the torch throat 54 which extends into the combustion chamber 52. That is, the at least one tangential inlet 59 is adjacent a side wall 54W of the torch throat 54. The combustion chamber 52 diameter to the torch throat 54 diameter, in one non limiting embodiment defines a ratio of approximately 2:1.

Figure 2C:
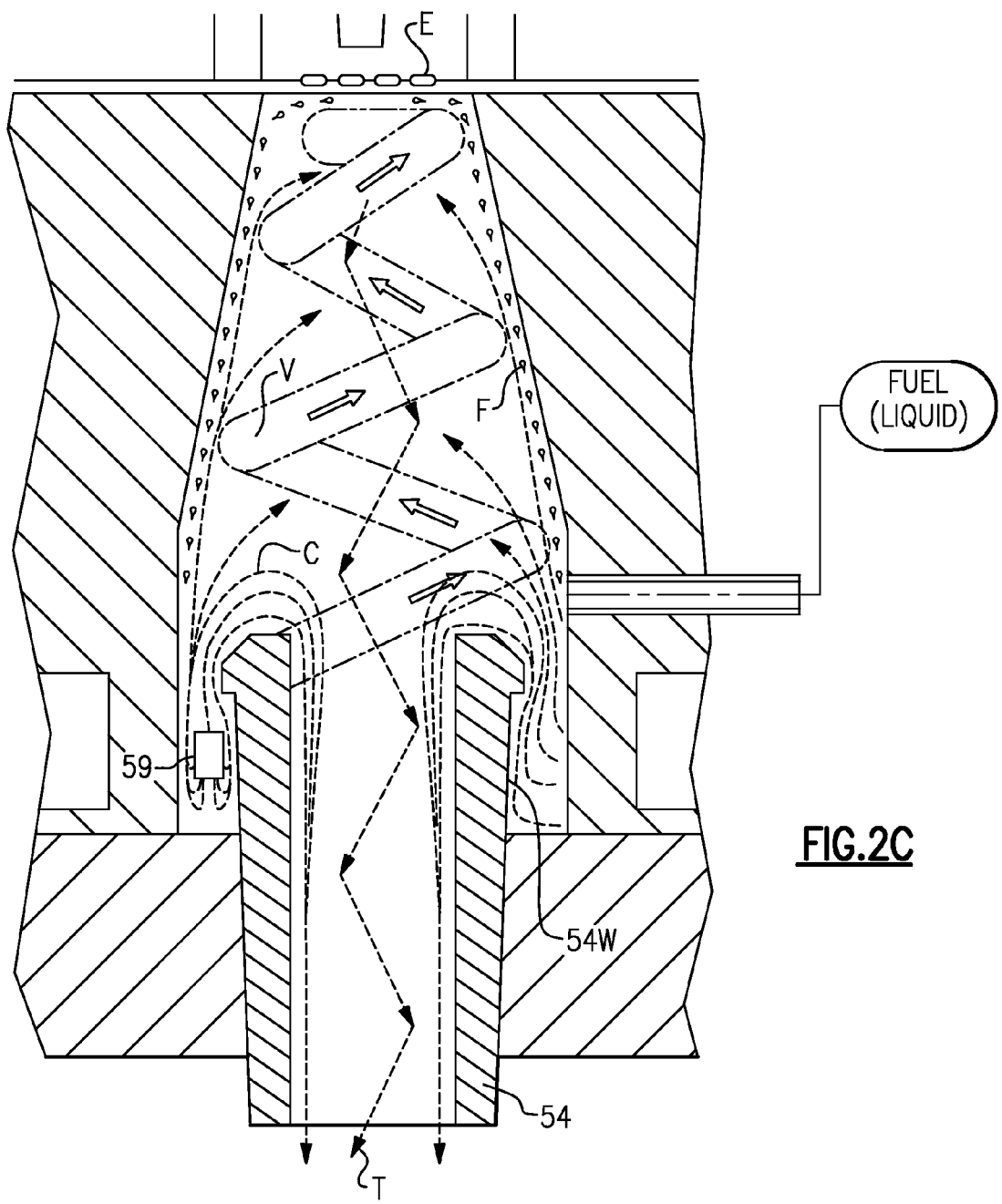
FIG. 2C is an expanded view of the combustion chamber and propellant flows therein.

The gaseous oxidizer is injected into the oxidizer inlet 56 for communication to the ring manifold 58 (FIG. 2C). The gaseous oxidizer enters the chamber 52 through the at least one tangential inlet 59 arranged tangentially relative to the throat axis L to generate the high vorticity flow (illustrated schematically by vorticity flow V). The ring manifold 58 and chamber 52 provides cyclone separator geometry where the tangential component flow generates a swirl flow structure with both a free vortex and solid body rotating vortex at the core, i.e., a Rankine Vortex.

Referring to FIG. 2C, the swirl flow V is an example of an axisymmetric flow structure which includes fluid motion in three dimensional space which may be described in polar coordinates as tangential, radial, and axial directions. The swirl flow V typically includes: (a) a large magnitude of tangential velocity which establishes centrifugal force field within the swirl flow thereby causing the flow expansion and further garnering tangential velocities while approaching the core region; (b) reversal of axial velocities with varied magnitudes along the length of the entire conical section that enable distributed fuel-laden oxidizer converge and sustain a burning column and preclude excel fueling at the apex region; and (c) radial velocity of relatively small magnitude and uniform distribution along the axis of the chamber from the apex to the throat entrance.

A portion of the gaseous oxidizer from the at least one tangential inlet 59 also impacts the torch side-wall 54W to form a slower film flow (illustrated schematically by cooling flow C) around and into the torch throat 54 to provide cooling thereof. A relatively significant percentage of the gaseous oxidizer generates the vorticity flow V while a relatively smaller percentage generates the cooling flow C. In one non limiting embodiment, both geometry and flow momentum affect the ratio of the gaseous oxidizer which generates the vorticity flow V to the relatively smaller percentage is utilized as the cooling flow C exceeding approximately 9:1.

The portion of the gaseous oxidizer which becomes the slower film cooling flow C moving in both axial and radial directions liner-flow along, around and within the torch throat 54 to eliminate the necessity of additional fluid as a wall-coolant. Notably, the relatively small portion of the gaseous oxidizer which exits as the cooling flow C will readily react with the ignitable propellant combination within the combustion chamber 24 (FIG. 1) of the combustion chamber assembly 12 such that the gaseous oxidizer is completely and efficiently utilized.

Fuel F is injected through the at least one radial fuel inlet 60 through the combustor chamber interior wall 52W such that the fuel F is communicated along the combustor chamber interior wall 52W by the vorticity flow V toward the truncated apex 52A. The fuel F may be essentially dribbled through the radial fuel inlet 60 such that the vorticity flow V provides both inward transport and turbulent eddies therewith to provide rapid entrainment and mixing.

At the apex 52A, the combustible mixture in the inner swirl region is ignited by the high temperature element E to form an ignited column flame (illustrated schematically by path T) and is capable of self-sustaining while axially reversing the direction toward the throat. High intensity combustion of the propellant combination is achieved through the high turbulence and small eddies therein. The ignited torch flame T is essentially entrained within the vorticity flow path V. As defined herein, "entrained" relates to the ignited torch flame T being communicated and at least partially contained within the through the vorticity flow V. The ignited torch flame T is directed within the vorticity flow V to exit through the torch throat 54 and ignites the ignitable propellant combination within the combustion chamber 24 (FIG. 1).

Figure 3:
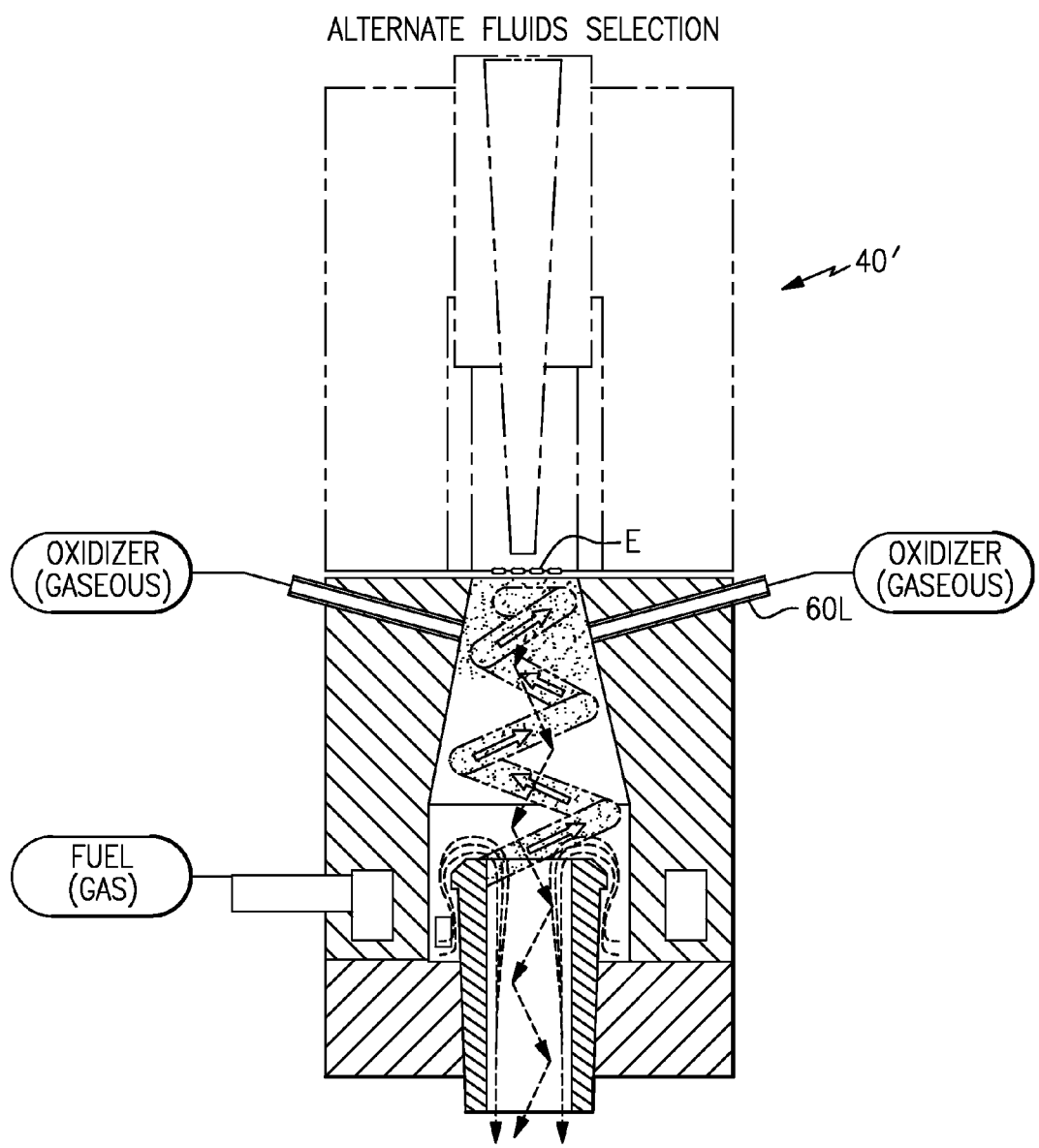
FIG. 3 is a schematic view of another a cyclone combustor torch igniter.

Referring to FIG. 3, at least one radial fuel inlet 60L in another embodiment may communicate fuel F through the combustor chamber interior wall 52W adjacent the truncated apex 52A to provide a radial/impingement injection. The radial fuel inlet 60L facilitates communication of, for example only, a gaseous oxidizer fan for safe mixture within the chamber 52.

The torch ignition system 18 provides consistent operation at oxygen rich and fuel rich operations with mixture ratios far from stoichiometry which demonstrate a wider flammability range and self-cooling without excess propellant usage. The torch ignition system 18 generates an effluent combustion product temperatures which exceeded 3000° F. which is greater that that typically required of combustion torch igniters. The torch ignition system 18 provides for reliable ignition and stable combustion.

The foregoing description is exemplary rather than defined by the limitations within. Many modifications and variations of the present application are possible in light of the above teachings. The preferred embodiments of this application have been disclosed, however, one of ordinary skill in the art would recognize that certain modifications would come within the scope of this application. It is, therefore, to be understood that within the scope of the appended claims, the application may be practiced otherwise than as specifically described. For that reason the following claims should be studied to determine the true scope and content of this application.

What is claimed is:

1. A method of cooling a torch igniter which has a combustion chamber and a torch throat comprising:
    axially flowing a first stream of gaseous oxidizer through the torch throat;
    vortically flowing a second stream of the gaseous oxidizer within the combustion chamber;
    communicating a fuel into the combustion chamber to yield a mixture with the second stream;
    igniting the mixture to yield a combusting mixture; and
    communicating the combusting mixture through the torch throat.

2. The method as recited in claim 1, further comprising vortically flowing the combusting mixture through the first and second streams.

3. The method as recited in claim 2, further comprising vortically flowing the combusting mixture in a direction opposite the second stream.

4. The method as recited in claim 1, wherein an interior surface of the torch throat is isolated from the combusting mixture by the first stream.

5. The method as recited in claim 1, wherein an interior surface of the combustion chamber is isolated from the combusting mixture by the second stream.

6. A method as recited in claim 1, further comprises:
    axially flowing the first stream to film cool the torch throat.

7. A method as recited in claim 1, further comprising:
    film cooling the combustion chamber with the fuel carried along an internal wall of the combustion chamber by the second stream.

8. An ignition system comprising:
    an ignition source;
    a combustion chamber adjacent said ignition source;
    a torch throat which extends into said combustion chamber opposite said ignition source to axially flow a first stream of gaseous oxidizer through said torch throat; and
    a ring manifold formed adjacent said combustion chamber, said ring manifold having at least one tangential inlet which communicates with said combustion chamber.

9. The system as recited in claim 8, wherein said ignition source includes a glow plug.

10. The system as recited in claim 8, further comprising a fuel injector in communication with said chamber.

11. The system as recited in claim 8, wherein said fuel injector is in communication with said combustion chamber at a frustro-conical chamber section of said combustion chamber.

12. The system as recited in claim 8, wherein said fuel injector is in communication with said combustion chamber at a cylindrical chamber section of said combustion chamber.

13. The system as recited in claim 8, wherein said fuel injector is in communication with said combustion chamber between said at least one tangential inlet and said ignition source.

14. The system as recited in claim 8, wherein said combustion chamber defines a frustro-conical section with a chamber apex adjacent said ignition source.

15. The system as recited in claim 12, wherein said chamber apex includes an opening for said ignition source.

16. A cyclone combustor torch igniter system comprising:
    a combustion chamber;
    a fuel injector in communication with said combustion chamber;

a torch throat which extends into said combustion chamber;

a ring manifold formed adjacent said combustion chamber, said ring manifold having at least one tangential inlet which communicates with said combustion chamber, said at least one tangential inlet operable to axially flow a first stream of a gaseous oxidizer through the torch throat and vortically flow a second stream of the gaseous oxidizer within the combustion chamber.

17. The system as recited in claim 14, wherein said fuel injector receives a gaseous fuel.

18. The system as recited in claim 14, wherein said fuel injector receives a liquid fuel.

19. The system as recited in claim 14, further comprising an ignition source opposite said torch throat to ignite a mixture of a fuel from the fuel injector and the second stream of the gaseous oxidizer to yield a combusting mixture.

20. The system as recited in claim 17, further comprising communicating the combusting mixture through the first stream and the second stream.

21. The system as recited in claim 17, further comprising communicating the combusting mixture through said torch throat.

22. The system as recited in claim 8, wherein said at least one tangential inlet which communicates with said combustion chamber is operable to vortically flow a second stream of the gaseous oxidizer within the combustion chamber.

23. An ignition system comprising:

an ignition source;

a combustion chamber adjacent said ignition source;

a torch throat which extends into said combustion chamber opposite said ignition source to flow a first stream of gaseous oxidizer through said torch throat; and a ring manifold formed adjacent said combustion chamber, said ring manifold having at least one tangential inlet which communicates with said combustion chamber to vortically flow a second stream of the gaseous oxidizer within the combustion chamber.

24. The system as recited in claim 23, wherein said first stream of gaseous oxidizer flows axially through said torch throat.

* * * * *